United States Patent
Jeon et al.

(10) Patent No.: US 9,729,691 B2
(45) Date of Patent: Aug. 8, 2017

(54) PORTABLE DEVICE AND METHOD FOR MULTIPLE RECORDING OF DATA

(75) Inventors: Jin Young Jeon, Seoul (KR); Sang Hyuk Koh, Seoul (KR); Tae Yeon Kim, Seoul (KR); Hyun Kyoung Kim, Seoul (KR); Hyun Mi Park, Seoul (KR); Hye Bin Park, Seoul (KR); Sae Gee Oh, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1038 days.

(21) Appl. No.: 13/589,813

(22) Filed: Aug. 20, 2012

(65) Prior Publication Data

US 2013/0054229 A1 Feb. 28, 2013

(30) Foreign Application Priority Data

Aug. 31, 2011 (KR) ........................ 10-2011-0087582

(51) Int. Cl.
*H04M 1/656* (2006.01)

(52) U.S. Cl.
CPC ........ *H04M 1/656* (2013.01); *H04M 2250/22* (2013.01); *H04M 2250/68* (2013.01); *H04M 2250/70* (2013.01); *H04M 2250/74* (2013.01)

(58) Field of Classification Search
CPC ...... G06F 3/011; G06F 3/012; G06F 3/04817; G06F 3/0482; G06F 3/0485;

(Continued)

(56) References Cited

U.S. PATENT DOCUMENTS 5,754,629 A 5/1998 Kunimori et al.
5,966,122 A * 10/1999 Itoh ............................... 715/838

(Continued)

FOREIGN PATENT DOCUMENTS

CN 1913684 A 2/2007
CN 101043347 A 9/2007

(Continued)

OTHER PUBLICATIONS

Avi, WindowsMobile6 Application Book First Edition, Mail Communications Nakagawa Nobuyuki, Feb. 20, 2009, First Edition, p. 92.

(Continued)

*Primary Examiner* — Abdelali Serrou
(74) *Attorney, Agent, or Firm* — Cha & Reiter, LLC.

(57) ABSTRACT

A portable device performs a multiple recording function by which data is recorded using different recording techniques. The device includes at least one of an input unit and a touch panel, which creates or supports an input signal for activating an audio-related function and an input signal for activating the multiple recording function while the audio-related function is performed. The device further includes a display panel configured to output a memo writing screen of a memo function in response to the activation of the multiple recording function, the memo writing screen allowing the activation of a voice recording function. The device also includes a control unit configured to control the output of the memo writing screen.

20 Claims, 13 Drawing Sheets

(58) Field of Classification Search
CPC .. G06F 3/0488; G06F 3/04883; G06F 1/1647;
G06F 3/041; G06F 3/0486; G06F 1/1624;
G06F 1/1626; G06F 2203/04803; G06F
3/0412; G06F 3/0416; G06F 3/04886;
G06F 2203/0381; G06F 3/01; G06F
3/038; G06F 3/0484; G09G 5/14; H04M
1/656; H04M 2250/22; H04M 2250/68;
H04M 2250/70; H04M 2250/74; G10L
15/22
See application file for complete search history.

(56) References Cited

U.S. PATENT DOCUMENTS

| | | | |
|---|---|---|---|
| 6,453,281 B1* | 9/2002 | Walters et al. | 704/200 |
| 6,732,915 B1* | 5/2004 | Nelson et al. | 235/375 |
| 8,806,364 B2* | 8/2014 | Hwang | G06F 3/0488 715/788 |
| 2003/0197744 A1* | 10/2003 | Irvine | G06F 3/038 715/856 |
| 2007/0123300 A1 | 5/2007 | Park et al. | |
| 2007/0275766 A1* | 11/2007 | Kim | H04M 1/27455 455/566 |
| 2009/0006089 A1 | 1/2009 | Shenassa et al. | |
| 2009/0041418 A1* | 2/2009 | Candelore et al. | 386/39 |
| 2009/0174680 A1* | 7/2009 | Anzures | G06F 1/1626 345/173 |
| 2009/0292782 A1* | 11/2009 | Kim | H04W 4/02 709/206 |
| 2009/0315705 A1* | 12/2009 | Kim | H04M 1/72572 340/539.13 |
| 2010/0056220 A1* | 3/2010 | Oh | G06F 1/1616 455/566 |
| 2010/0122195 A1* | 5/2010 | Hwang | G06F 3/0488 715/769 |
| 2010/0137027 A1* | 6/2010 | Kim | G06F 3/03547 455/556.1 |
| 2010/0257447 A1* | 10/2010 | Kim | G06F 3/04883 715/702 |
| 2011/0016429 A1* | 1/2011 | Yoshihama | 715/838 |
| 2011/0080356 A1* | 4/2011 | Kang | G06F 3/0486 345/173 |
| 2011/0087990 A1* | 4/2011 | Ng | G06F 3/04886 715/773 |
| 2011/0238766 A1* | 9/2011 | Lew | H04L 12/588 709/206 |
| 2011/0269433 A1 | 11/2011 | Park et al. | |
| 2012/0064947 A1* | 3/2012 | Yi et al. | 455/566 |
| 2013/0067375 A1* | 3/2013 | Kim | F25D 29/00 715/769 |

FOREIGN PATENT DOCUMENTS

| | | |
|---|---|---|
| CN | 101232542 A | 7/2008 |
| EP | 0 949 621 A2 | 10/1999 |
| EP | 1 753 210 A2 | 2/2007 |
| JP | 2004-96502 A | 3/2004 |
| JP | 2007-53750 A | 3/2007 |
| JP | 2008-124754 A | 5/2008 |

OTHER PUBLICATIONS

Honma Hajime, Using Evernote for the First Time First Edition, Engineer Masaaki Hoshi, Oct. 15, 2010, First Edition, pp. 51-54, 231, 232 (document with the well-known feature).
Tochio Emy, Android Information Utilization First Edition, MDN Corporation Isao Fujioka, May 1, 2011, First Edition, p. 164 (document with the well-known feature).
Chinese Search Report dated Jul. 25, 2016.
Japanese Search Report dated Sep. 20, 2016.

* cited by examiner

PORTABLE DEVICE AND METHOD FOR MULTIPLE RECORDING OF DATA

CLAIM OF PRIORITY

This application claims, pursuant to 35 USC 119(a), priority to, and the benefit of the earlier filing date of, a Korean patent application filed in the Korean Intellectual Property Office on Aug. 31, 2011 and assigned Serial Number 10-2011-0087582, the contents of which are incorporated by reference herein.

BACKGROUND OF THE INVENTION

1. Field of the Invention

The present invention relates in general to the recording of data and, more particularly, to a portable device for and a method for supporting multiple recordings in which a voice recording is available for a memo application.

2. Description of the Related Art

A great variety of portable devices based on mobility and having a communication function have been increasingly popularized due to their convenience and portability. Such a portable device may provide some input techniques for the user. For instance, a portable device known in the art having a touch screen composed of a touch panel and a display panel may process any user actions made on the touch panel to select or manipulate graphical elements or images displayed on the display panel. Then depending on the user action, the portable device may create a touch event and control a specific application.

Meanwhile, the user of the portable device may use a memo function to make a short note as a reminder. Typically, a memo application merely offers a function to write text and to store written text. Since a memo is for a brief record only, the user may often fail to understand the contents of stored memos after a lapse of some time. Additionally, since memos are stored indiscriminately, it may be difficult and inconvenient for the user to manage such memos.

SUMMARY OF THE INVENTION

Accordingly, the present invention addresses the above-mentioned problems and/or disadvantages and to offer at least the advantages described below.

One aspect of the present invention is to provide a portable device for and a method for supporting multiple recordings, namely, for allowing the recording of data on the basis of different recording techniques.

Another aspect of the present invention is to provide a portable device for and a method for multiple recordings that allow more easily retrieving, checking, and managing recorded data.

According to one aspect of the present invention, a method is provided for supporting a multiple recording function, the method comprising: receiving an input signal for activating an audio-related function; receiving an input signal for activating the multiple recording function while the audio-related function is performed; and in response to the activation of the multiple recording function, outputting a memo writing screen of a memo function that allows invoking a voice recording function.

According to another aspect of the present invention, a portable device is provided for supporting a multiple recording function, the device comprising: at least one of an input unit and a touch panel configured to create or support an input signal for activating an audio-related function and an input signal for activating the multiple recording function while the audio-related function is performed; a display panel configured to output a memo writing screen of a memo function in response to the activation of the multiple recording function, the memo writing screen allowing the invocation of a voice recording function; and a control unit configured to control the output of the memo writing screen.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above features and advantages of the invention will become more apparent from the following description taken in conjunction with the accompanying drawings in which.

DETAILED DESCRIPTION OF THE INVENTION

Figure 1:
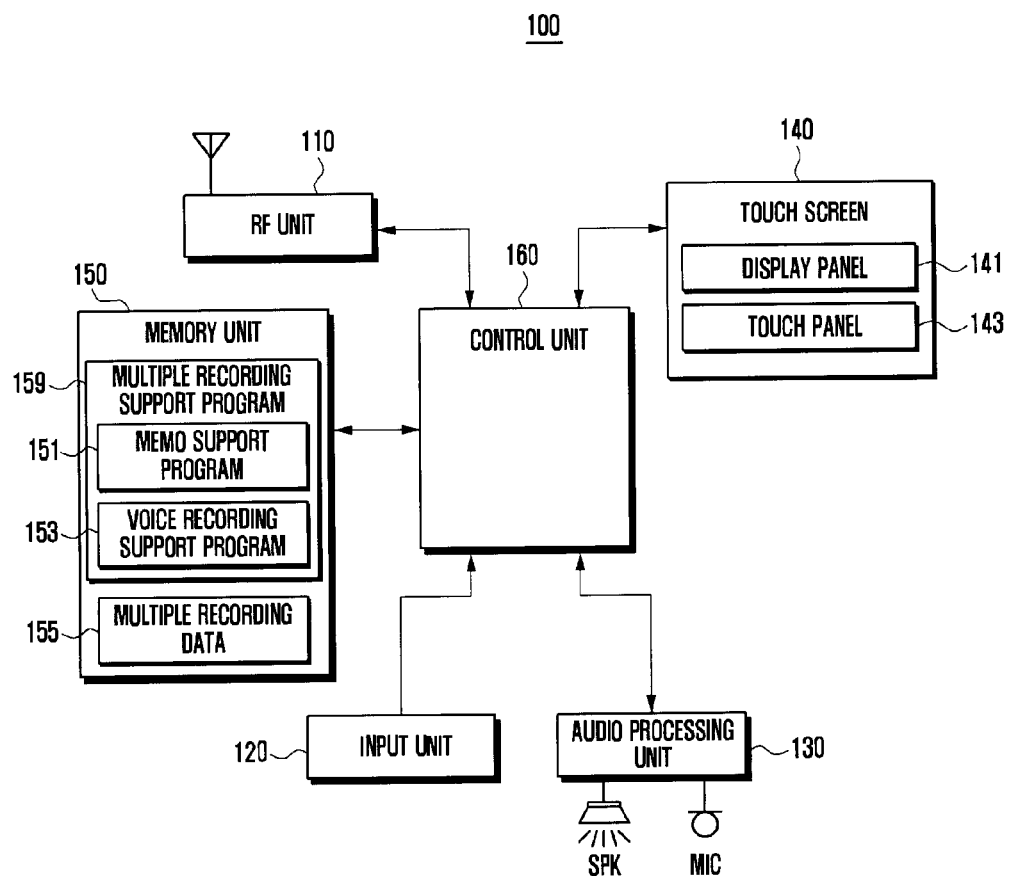
FIG. 1 is a block diagram illustrating the configuration of a portable device in accordance with an exemplary embodiment of the present invention.

Hereinafter, preferred and non-limiting embodiments of the present invention will now be described herein below with reference to the accompanying drawings. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention. Also, terms described herein, which are defined considering the functions of the present invention, may be implemented differently depending on user and operator's intention and practice. Therefore, the terms should be understood on the basis of the the disclosure throughout the specification.

Furthermore, well known or widely used techniques, elements, structures, and processes may not be described or illustrated in detail to avoid obscuring the essence of the present invention. The same reference numbers are used throughout the drawings to refer to the same or like parts. Although the drawings represent exemplary embodiments of the invention, the drawings are not necessarily to scale and certain features may be exaggerated or omitted in order to better illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Among the terms set forth herein, an icon refers to a graphical element such as a figure or a symbol displayed on the screen of the device such that a user can easily select a desired function or data. In particular, each icon has a mapping relation with any function being executable in the device or with any data stored in the device and is used for processing functions or selecting data in the device. When a user selects one of the displayed icons, the device identifies a particular function or data associated with the selected icon. Then the device executes the identified function or displays the identified data.

Among terms set forth herein, data refers to any kind of information processed by the device, including text and/or images received from any external entities, messages transmitted or received, and information created when a specific function is executed by the device.

FIG. 1 is a block diagram illustrating the configuration of a portable device in accordance with the exemplary embodiment of the present invention.

Referring to FIG. 1, the portable device 100 may be a terminal, such as a mobile terminal, and may include a radio frequency (RF) unit 110, an input unit 120, an audio processing unit 130, a touch screen 140, a memory unit 150, and a control unit 160.

The portable device 100 having the above-specified elements may support both a memo function and a voice recording function in order to implement a multiple recording function. Furthermore, the portable device 100 may store and manage multiple recording data composed of memo data and voice recording data. In addition, the portable device 100 may activate a memo function during the operation of any audio signal related function such as a call function operating with the RF unit 110, and also may record voices collected from a call. Additionally, the portable device 100 may create multiple recording data by incorporating voice recording data into memo data, may store the created data, and may support a search for the stored data on the basis of the memo data and/or voice recording data.

The RF unit 110 establishes communication channels for a voice call, a video call, a transmission of image data or message data, etc. under the control of the control unit 160. Namely, the RF unit 110 establishes a voice call channel, a video call channel, a data communication channel, or the like in a mobile communication system. For this, the RF unit 110 may include an RF transmitter that up-converts the frequency of an outgoing signal and then amplifies the signal, and an RF receiver that amplifies an incoming signal with low-noise, and down-converts the frequency of the signal. In addition, during a voice call, a video call, or a data communication, the RF unit 110 may receive audio signals from other devices or servers, and then send the received audio signals to the control unit 160. The audio signals received by the RF unit 110 may be stored as voice recording data according to a user's control. Meanwhile, during the operation of the RF unit 110, a multiple recording function may be activated. Namely, while the RF unit 110 operates, a memo writing screen, that allows the invocation of a voice recording function, may be outputted. Using a multiple recording function, the user may write a memo while recording audio signals received through the RF unit 110.

The input unit 120 includes a plurality of input keys and function keys to receive a user's input actions and to set up various functions. The function keys may have navigation keys, side keys, shortcut keys, and any other special keys defined to perform particular functions. Additionally, the input unit 120 receives a user's key manipulations for controlling the portable device 100, creates corresponding input signals, and then delivers the input signals to the control unit 160. The input unit 120 may be embodied with a mechanical keypad such as a QWERTY keypad, a 3*4 keypad, a 4*3 keypad, or any other typical key arrangement. Alternatively or additionally, the input unit 120 may be embodied with any kind of virtual key map such as a QWERTY key map, a 3*4 key map, a 4*3 key map, or the like, visually outputted on the touch screen 140. When the device 100 supports the touch screen 140 in the form of a full touch screen, the input unit 120 may have only side keys formed on sides of a device body without any key buttons or mechanical keypad.

In addition, depending on user's manipulation, the input unit 120 may create an input signal for activating a multiple recording function, an input signal for requesting the activation of a voice recording function while a memo function is activated according to the activation of a multiple recording function, an input signal for completing a voice recording, an input signal for storing voice recording data together with memo data as multiple recording data, an input signal for searching stored multiple recording data, and the like. The created input signal is sent to the control unit 160 for performing a specific function in response to the input signal.

The audio processing unit 130 includes a speaker (SPK) that outputs audio signals received through a communication channel or from currently playing content, and a microphone (MIC) that collects a user's voice or other audio signals. In addition, the audio processing unit 130 may activate the microphone for supporting a voice recording function during the operation of a multiple recording function, namely, while a memo function is activated, in order to collect audio signals when a memo is written. The collected audio signals may be stored together with the written memo data as multiple recording data.

The touch screen 140 includes a display panel 141 and a touch panel 143. In the touch screen 140, the touch panel 143 may be disposed on the front or rear face of the display panel 141.

The display panel 141 displays information, including various screens and menus of the portable device 100, as described herein, inputted by or offered to the user. Namely, the display panel 141 may visually offer a variety of screen views in connection with the use of the portable device 100, such as an idle screen, a menu screen, a message writing screen, a call screen, and the like, as well as a graphical user interface (GUI). The display panel 141 may be include an LCD (liquid crystal display), an OLED (organic light emitting diodes), or any other equivalent or known display devices.

In addition, the display panel 141 offers suitable interfaces for supporting a multiple recording function. Such interfaces may include a memo writing screen interface invoked by the activation of a memo function, a voice recording screen interface invoked by the activation of a voice recording function during memo writing, a memo writing screen interface combined with voice recording data after the completion of a voice recording, a screen interface for outputting written memo data in the form of multiple images, and the like. Furthermore, the display panel 141 may offer a screen interface for searching multiple recording data produced according to the operation of a multiple recording function. Various screen interfaces outputted through the display panel 141 will be described later in greater detail with reference to other drawings.

The touch panel 143 is disposed on the front or rear side of the display panel 141. The touch panel 143 may create a touch event in response to contact by a touching object such as fingers, a stylo, or other devices, and then may send the created touch event to the control unit 160. Sensors that constitute the touch panel 143 may be disposed in the form of a matrix, and may send information about the location of and the type of touch event to the control unit 160. In addition, the touch panel 143 may support a touch function on a memo writing screen when a multiple recording function is activated. Namely, the touch panel 143 may support the creation of a touch event that allows letters, lines, images, etc. to be outputted on a memo writing screen. Also, when any image corresponding to voice recording data is outputted on a memo writing screen, the touch panel 143 may disallow specific memo data to be written on such an image. And also, in case of some touch events, the touch panel 143 may allow specific memo data to be written on such an image.

The memory unit 150 stores a variety of applications required for functions related to an embodiment of this invention or required for the execution or playback of various types of files. Further, the memory unit 150 may store a key map, a menu map, etc. required for the operation of the touch screen 140. Here, the key map may have various known key layout types such as a keyboard map, a 3*4 key map, and a QWERTY key map, or may have a special control key map suitable for the operation of a currently activated application. Also, the menu map may be a typical or default menu map or any other special menu map suitable for the operation of a currently activated application. The memory unit 150 may include a program region and a data region.

The program region may store an operating system (OS) for booting and operating the portable device 100, and various applications required for performing various functions of the device 100 such as an application for supporting a call function, a web browser for access to the Internet, a sound output application, an image viewer application, a video player application, or the like. In addition, the program region may contain a multiple recording support program 159 that has a memo support program 151 and a voice recording support program 153.

The memo support program 151 is used for supporting or performing a memo writing function and a multiple recording function of the device 100. The memo support program 151 may have a routine for outputting a memo writing screen, a routine for supporting a memo writing process, and a routine for storing a written memo. Additionally, the memo support program 151 may have a routine for providing a menu to invoke a voice recording function while a memo writing screen is outputted, a routine for adding voice recording data to a memo writing screen when the voice recording data is created in a voice recording function, and a routine for storing memo data combined with voice recording data as multiple recording data. Also, the memo support program 151 may further have a routine for converting multiple recording data into thumbnail images and then displaying the thumbnail images on a multiple image screen, and a button map output routine for invoking a multiple recording function during a call.

The voice recording support program 153 is for supporting a voice recording function, especially during a memo writing process. The voice recording support program 153 may have a routine for activating a voice recording function in response to the selection of a specific menu when a memo writing screen is supported, a routine for creating voice recording data using recorded data in response to a recording completion signal, and a routine for providing the created voice recording data to the memo support program 151. In addition, the voice recording support program 153 may have a title support routine for converting audio signals contained in voice recording data into text and then for outputting at least parts of such text on the screen, a routine for moving a display zone of a voice recording function, and a routine for playing voice recording data linked to the display zone in response to a play command. Also, the voice recording support program 153 may have a routine for outputting various control maps that control voice recording states.

The title support routine may have a sub-routine for allocating a part of available text with a specific length from the beginning in the text to a title of voice recording data, and a sub-routine for applying the title to a display zone of a voice recording function. Also, the title support routine may have a sub-routine for extracting words frequently used more than a predetermined number of times, as dictated by a designer's consideration, from the text and then allocating the extracted words to the title.

The data region stores data created or received while the portable device 100 is used, for example, phonebook data, at least one icon in connection with a widget function, and any other content. Also, the data region may store a user's input received through the touch panel 143. In addition, the data region may store multiple recording data 155, which may be created on the basis of a memo function and a voice recording function. Namely, the multiple recording data 155 may have a mixed form of memo data and voice recording data. Further, the data region may store any data for supporting a voice recognition function.

The control unit 160 controls a power supplying and initializing process for each element of the portable device 100. After initializing, the control unit 160 may control various signal flows required for the activation of a multiple recording function in the portable device 100. For this, the control unit 160 may include detailed configurations such as shown, for example, in FIG. 2.

Figure 2:
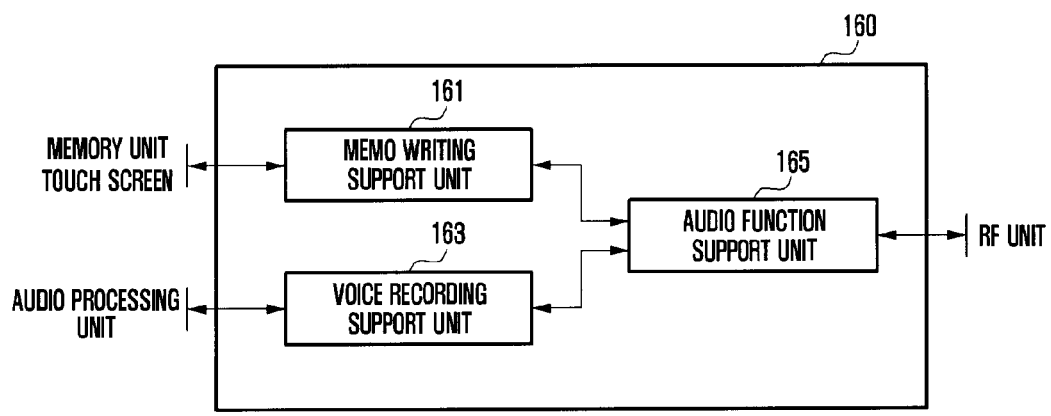
FIG. 2 is a block diagram illustrating a detailed configuration of the control unit shown in FIG. 1.

FIG. 2 is a block diagram illustrating a detailed configuration of the control unit shown in FIG. 1.

Referring to FIG. 2, the control unit 160 may include a memo writing support unit 161, a voice recording support unit 163, and an audio function support unit 165.

The memo writing support unit 161 may support a memo function of the device 100 in connection with a multiple recording function of this invention. Specifically, the memo writing support unit 161 may provide a menu or widget item for activating a memo function and also support displaying a memo writing screen on the display panel 141 in response to an input signal of the menu or widget item. In addition, the memo writing support unit 161 may support displaying a link image or button map for the activation of a memo function on the display panel 141 when any audio-related user function such as a call function or a voice recording function is activated.

Meanwhile, the memo writing support unit 161 may support displaying a link image or button map for the activation of a voice recording function on a memo writing screen such that a voice recording function can be used during a memo writing process based on a multiple recording function. When a voice recording function is invoked, the memo writing support unit 161 may support displaying a specific image indicating voice recording data produced by the completion of a voice recording process on the screen. For instance, the memo writing support unit 161 may support displaying voice recording data in a display zone of a voice recording function and also support moving the display zone on a memo writing screen in response to a user's manipulation. Additionally, when the device is changed from a portrait mode (i.e., a lengthwise mode) to a landscape mode (a widthwise and vice versa, the memo writing support unit 161 may adjust the size of the display zone according to the screen ratio. And also, when the size of a memo writing screen is changed depending on a zoom-in or zoom-out input signal, the memo writing support unit 161 may adjust the size of the display zone according to the screen size.

When multiple recording data is stored according to the closing of a memo writing screen, the memo writing support unit 161 may convert the multiple recording data into a thumbnail image. Then, for a data search, the memo writing support unit 161 may support displaying such thumbnail images on a multi-image screen. Each thumbnail image may contain a specific image corresponding to a display zone of a voice recording function as well as the content of a memo. Additionally, the memo writing support unit 161 may convert only the content of a memo into a thumbnail image without containing the corresponding display zone, and then may support displaying a specific index together with the thumbnail image. This specific index indicates that the thumbnail image accompanies voice recording data. Alternatively, the memo writing support unit 161 may support separately displaying voice recording data while the thumbnail image is displayed on a multi-image screen.

The voice recording support unit 163 may support a voice recording function of the device 100 in connection with a multiple recording function of the present invention. In addition, when a memo writing screen is provided according to a multiple recording function, the voice recording support unit 163 may support a voice recording function. The voice recording support unit 163 may support displaying a control map related to a voice recording process on the memo writing screen in response to an input signal for activating a voice recording function. This control map may be outputted in various forms. A screen interface related to the control map will be described later in greater detail. Meanwhile, when an input signal for the completion of voice recording is received, the voice recording support unit 163 may create voice recording data. In this process, the voice recording support unit 163 may collect information about the entire recording time and the date of the voice recording, and then insert the information in the voice recording data. Also, the voice recording support unit 163 may create an arbitrary title of the voice recording data. In addition, the voice recording support unit 163 may recognize at least parts of voices contained in the voice recording data. For this, the voice recording support unit 163 may use a voice recognition database stored in the memory unit 150. After voice recognition is completed, the voice recording support unit 163 may use at least parts of voice-recognized content as a title such that a display zone of a voice recording function shows voice-recognized text as the title on a memo writing screen. Additionally, the voice recording support unit 163 may find specific words frequently used more than a predetermined number of times in the voice-recognized content, and then allocate the most frequently used word or some frequently used words to the title.

Also, when creating voice recording data, the voice recording support unit 163 may collect only memo data written during a voice recording process, and then insert the memo data into the voice recording data. Therefore, when a display zone of a voice recording function is displayed on a memo writing screen, such memo data may be displayed in a position as supplementary memo data near the display zone. If there is no additional memo data during a voice recording process, only the display zone may be displayed on the memo writing screen by the memo writing support unit 161.

The audio function support unit 165 may support an audio-related function, such as a call function, a voice recording function, a broadcast receiving function, or a radio function, of the device 100 in connection with a multiple recording function of the present invention. In addition, when supporting a specific audio-related function, the audio function support unit 165 may support displaying a link image or button map for invoking a multiple recording function on the display panel 141. Then, when an input signal for invoking a multiple recording function is received according to a user's manipulation, the audio function support unit 165 may invoke at least one of the memo writing support unit 161 and the voice recording support unit 163, depending on the property of the input signal. Meanwhile, when any audio-related function performed by the audio function support unit 165 is deactivated, a memo function supported by the memo writing support unit 161 and a voice recording function supported by the voice recording support unit 163 may automatically store data up to that time. Also, depending on a user's setting or a designer's or manufacturer's intent, the memo writing support unit 161 and the voice recording support unit 163 may automatically deactivate the memo function and the voice recording function or maintain them for a predetermined minimum amount of time.

As discussed above, the device for supporting multiple recordings of data in accordance with the exemplary embodiment of the present invention may perform a voice recording function in a memo recording process and also store multiple recording data by combining voice recording data obtained through the voice recording function with memo data obtained through a memo function. This allows the user to easily and conveniently use a voice recording function together with a memo function while any audio-related function such as a call function is operating. Further, since both memo data and voice recording data are stored and managed together, the user may simply conduct a data search through at least one of voice recording data and memo data.

Figure 3:
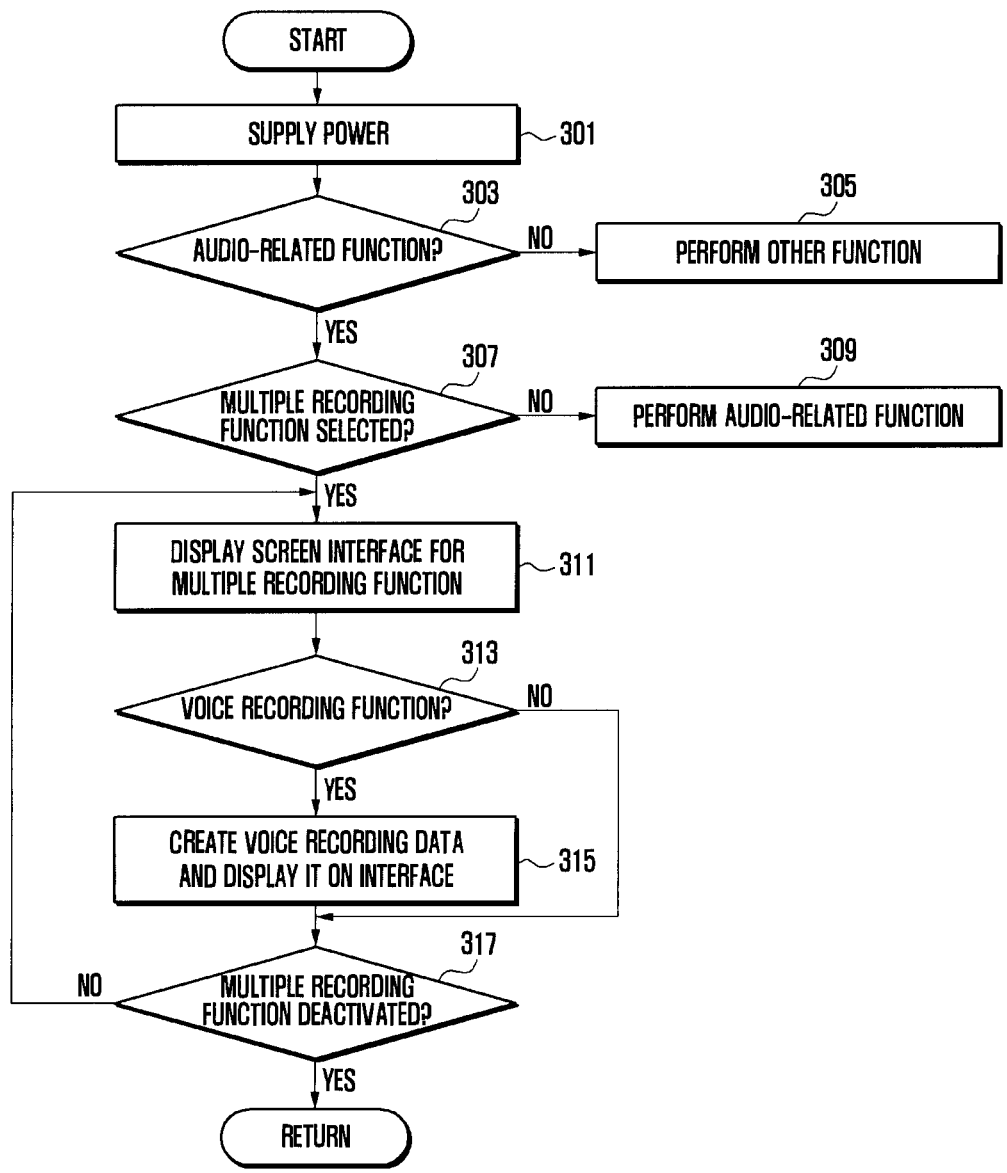
FIG. 3 is a flow diagram illustrating a method for multiple recordings of data in accordance with the exemplary embodiment of the present invention.

FIG. 3 is a flow diagram illustrating a method for multiple recordings of data in accordance with the exemplary embodiment of the present invention.

Referring to FIG. 3, the control unit 160 may control the supply of power to respective elements of the device 100 shown in FIG. 1, in step 301. Then the control unit 160 may check whether an input signal for activating an audio-related function such as a call function or a recording function is received in step 303. If an input signal unrelated to the audio-related function is received, the control unit 160 may perform a particular function, e.g., a file search function, a web access function, etc. in response to the received input signal, in step 305.

However, if an input signal for activating the audio-related function is received in step 303, the control unit 160 may further check whether an input signal for selecting a multiple recording function is received in step 307. If there is no input signal for invoking the multiple recording function, the control unit 160 may perform the audio-related function in step 309. Namely, in the step 309, the control unit 160 may support the output of audio signals in connection with the audio-related function, such as a call function, a voice recording function, a broadcast receiving function, or a radio function, selected in the step 303, and then support the output of a corresponding screen, if necessary.

However, if an input signal for selecting the multiple recording function is received in step 307, the control unit 160 may support displaying a screen interface for the multiple recording function on the display panel in step 311. This screen interface may be a memo writing screen that allows the creation of an input signal for invoking a voice recording function. When an input signal for writing a memo is received, namely when any touch event occurs on the screen interface, the control unit 160 may support a memo writing process in response to the touch event.

Meanwhile, the control unit 160 may determine whether an input signal for activating a voice recording function is received in step 313. If no input signal is received, the method proceeds to step 317, as described herein. However, if an input signal is received, the control unit 160 may activate the voice recording function in step 315. In this step, the control unit 160 may support displaying a specific image indicating the activation of the voice recording function on the memo writing screen. Even while the voice recording function is activated, the control unit 160 may support the memo writing process provided by the memo function. When an input signal for completing voice recording is received, the control unit 160 may create voice recording data from recorded voices and then change the memo writing screen. Namely, the control unit 160 may support displaying a display zone of the voice recording function on the memo writing screen.

Next, after step 315, the control unit 160 may determine whether an input signal for deactivating the multiple recording function is received in step 317. If not, the control unit 160 may return to the step 311 and then perform again the successive steps. However, in step 317, if an input signal for deactivating the multiple recording function is received, the control unit 160 may return to step 303 and then perform again the successive steps.

Now, screen interfaces used for a multiple recording function will be described in greater detail with reference to the drawings.

Figure 4:
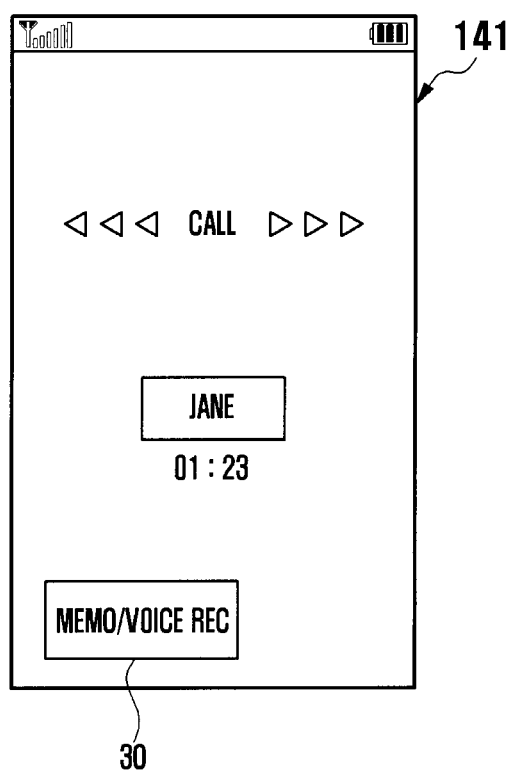
FIG. 4 is an illustration of a screen interface for invoking a multiple recording function in accordance with the exemplary embodiment of the present invention.

FIG. 4 is an illustration of a screen interface for invoking a multiple recording function in accordance with the exemplary embodiment of the present invention.

The user of the device 100 may use any audio-related function, e.g., a call function. Namely, when any incoming call arrives from another device or when a reply to any outgoing call is received from the recipient, the device 100 may establish a call channel with the other device, and then perform a call function. In this case, the device 100 may display a call screen on the display panel 141 as shown in FIG. 4.

In addition, the control unit 160 may perform displaying a link image or button map 30 for activating a multiple recording function on the call screen. The user who desires to use the multiple recording function may enter an input signal for selecting the button map 30, e.g., may conduct a touch event of selecting the button map 30. In response to a user's input, the control unit 160 may perform displaying a screen interface for the multiple recording function while maintaining or performing the call function through background processing.

Figure 5:
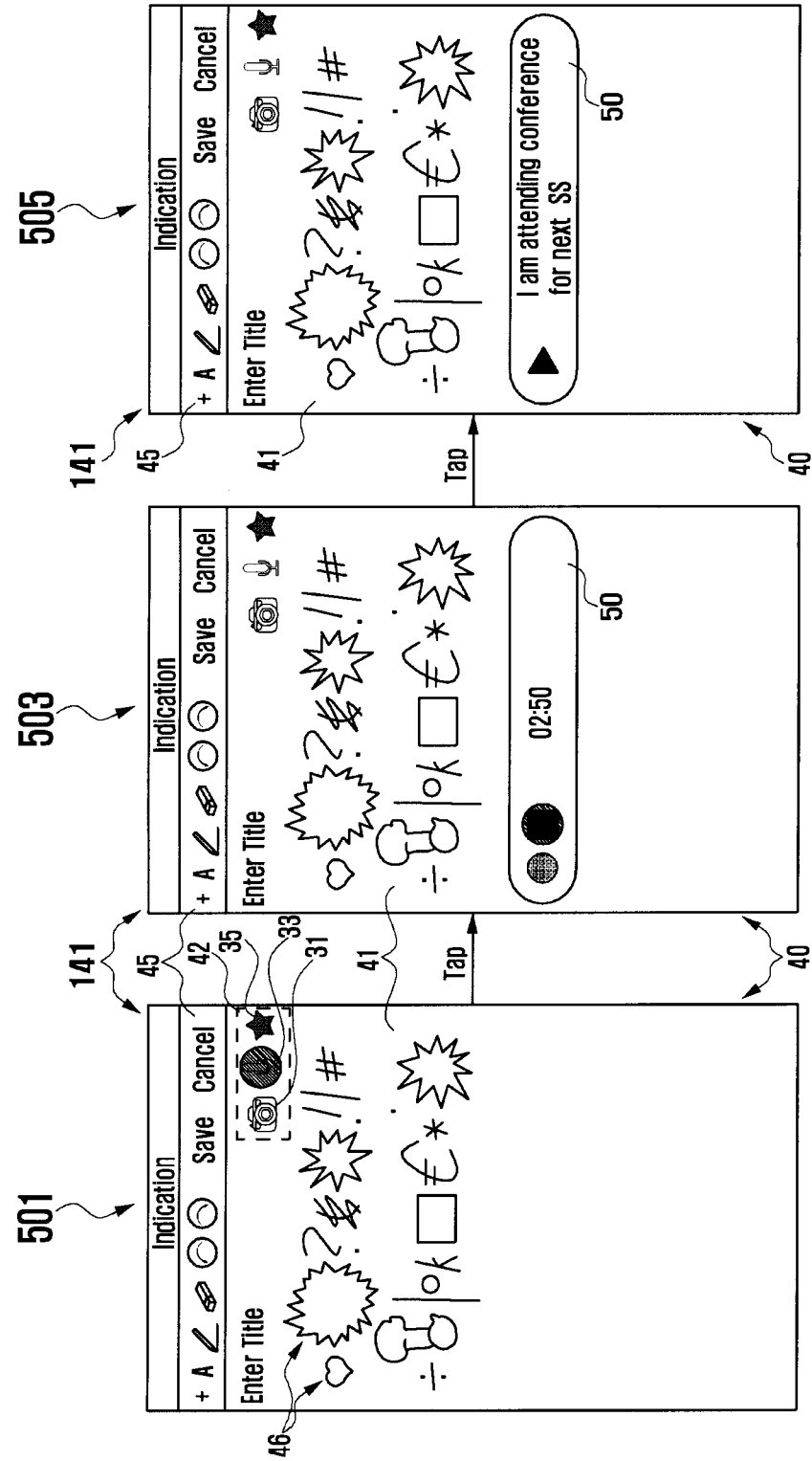
FIG. 5 is an illustration of a progression of screen interfaces for supporting a multiple recording function in accordance with the exemplary embodiment of the present invention.

FIG. 5 is an illustration of a progression of screen interfaces for supporting a multiple recording function in accordance with the exemplary embodiment of the present invention.

Referring to FIG. 5, the display panel 141 may display a memo writing screen 40 in connection with a memo function thereon. In a first configuration 501 of the display panel 141, the memo writing screen 40 may include a memo zone 41 for writing a memo, a frame zone 45 for selecting tools in connection with a memo writing process, and an invocation zone 42 for invoking a multiple recording function. The invocation zone 42 may have a camera icon 31 for invoking a camera function, a voice recording icon 33 for invoking a voice recording function, and a special function icon 35 for invoking a special function. In the first configuration 501, the user who desires to use the multiple recording function may enter an input signal for selecting the voice recording icon 33; for example, by tapping or otherwise selecting the icon 33.

Then the display panel 141 may display a screen interface in a second configuration 503, to which the voice recording function is applied. In particular, as shown in the second configuration 503, the display panel 141 may display a display zone 50 of a voice recording function to indicate the activated state of voice recording. The display zone 50 of the voice recording function may be positioned in the memo zone 41 such that the display zone 50 does not overlap existing memo data 46. The display zone 50 may have specific indexes or images to indicate various states in connection with a voice recording process. If voice recording is in use as shown in the second configuration 503 of the display panel 141, the display zone 50 may display a specific index for indicating the activated state of voice recording, or voice recording time.

The user may enter an input signal for completing voice recording. For instance, the user may tap or otherwise select a stop button in the display zone 50 of a voice recording function on the display panel 141 shown in the second configuration 503. Then, as indicated by the third configuration 505 of the display panel 141 of FIG. 5, the display panel 141 may display a title of voice recording data in the display zone 50. For displaying the title, the control unit 160 may convert at least parts of recorded voices into text through a voice recognition method known in the art, and then allocate at least parts of such text to the title in the display zone 50.

Figure 6:
FIG. 6 is an illustration of a control interface for supporting a voice recording function with a multiple recording function in accordance with the exemplary embodiment of the present invention.

FIG. 6 is an illustration of a control interface or map for supporting a voice recording function with a multiple recording function in accordance with the exemplary embodiment of the present invention.

Referring to FIG. 6, the control interface or map may be displayed in the display zone 50 of a voice recording function and may include the first control map or icon 601 and the second control map or icon 603. The first control map 601 may indicate that voice recording is running, and may show a stop button formed of, for example, a rectangular image for the completion of voice recording. The second control map 603 may indicate that voice recording is stopped, and may show a play button formed of, for example, a triangular image for playing recorded voices.

Additionally, the control map may further include the third control map or icon 605 and the fourth control map or icon 607, shown in FIG. 6. The third control map 605 may indicate that recorded voices are played, and may show a pause button and a stop button. The fourth control map 607 may indicate that playing of recorded voices is paused, and may show a play button and a stop button.

This control map may allow the user to easily select voice recording, playing of recorded voices, stop or pause. The above-discussed first control map 601 and fourth control map 607 may have various forms and may be displayed in the memo zone 41 on the memo writing screen 40 shown in any of the configurations 501, 503, 505 of the display panel 141 in FIG. 5.

Figure 7:
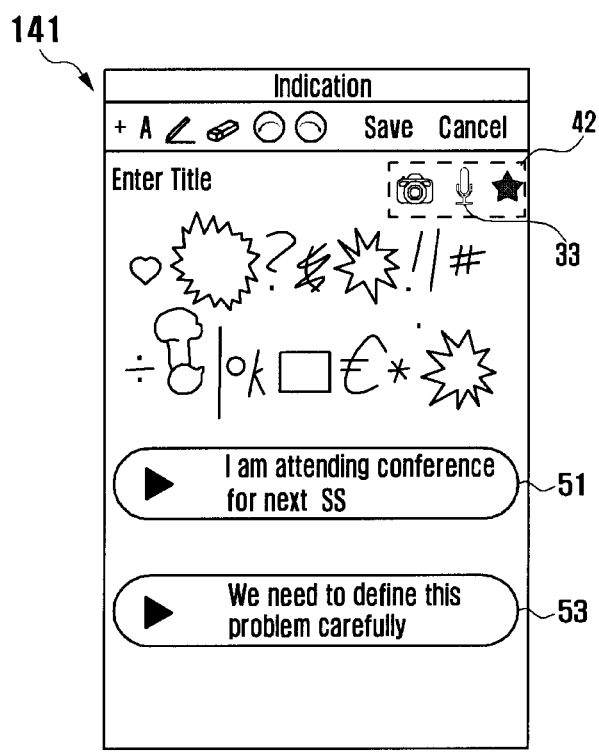
FIG. 7 is an illustration of a screen interface for using a voice recording function with a multiple recording function in accordance with the exemplary embodiment of the present invention.

FIG. 7 is an illustration of a screen interface for using a voice recording function with a multiple recording function in accordance with the exemplary embodiment of the present invention.

Referring to FIG. 7, the display panel 141 may display two or more display zones 51 and 53 of a voice recording function. For this, the user may further activate a voice recording function in the state of the display panel 141 shown in the third configuration 505 in FIG. 5. Namely, when the first voice recording data is created in any audio-related function, the device 100 may display the first display zone 51 on the display panel 141 in the third configuration 505.

Thereafter, the user may select again the voice recording icon 33 from among icons contained in the invocation zone 42. Then the control unit 160 may activate a new voice recording function and support displaying the second display zone 53 on the display panel 141. The second display zone 53 may be separated from the first display zone 51.

After the second voice recording function is completed, the control unit 160 may create the second voice recording data and enter a title in the second display zone 53. In this process, the control unit 160 may convert at least parts of the second voice recording data into text through voice recognition, and then allocate at least parts of such text to the title in the second display zone 53.

Figure 8:
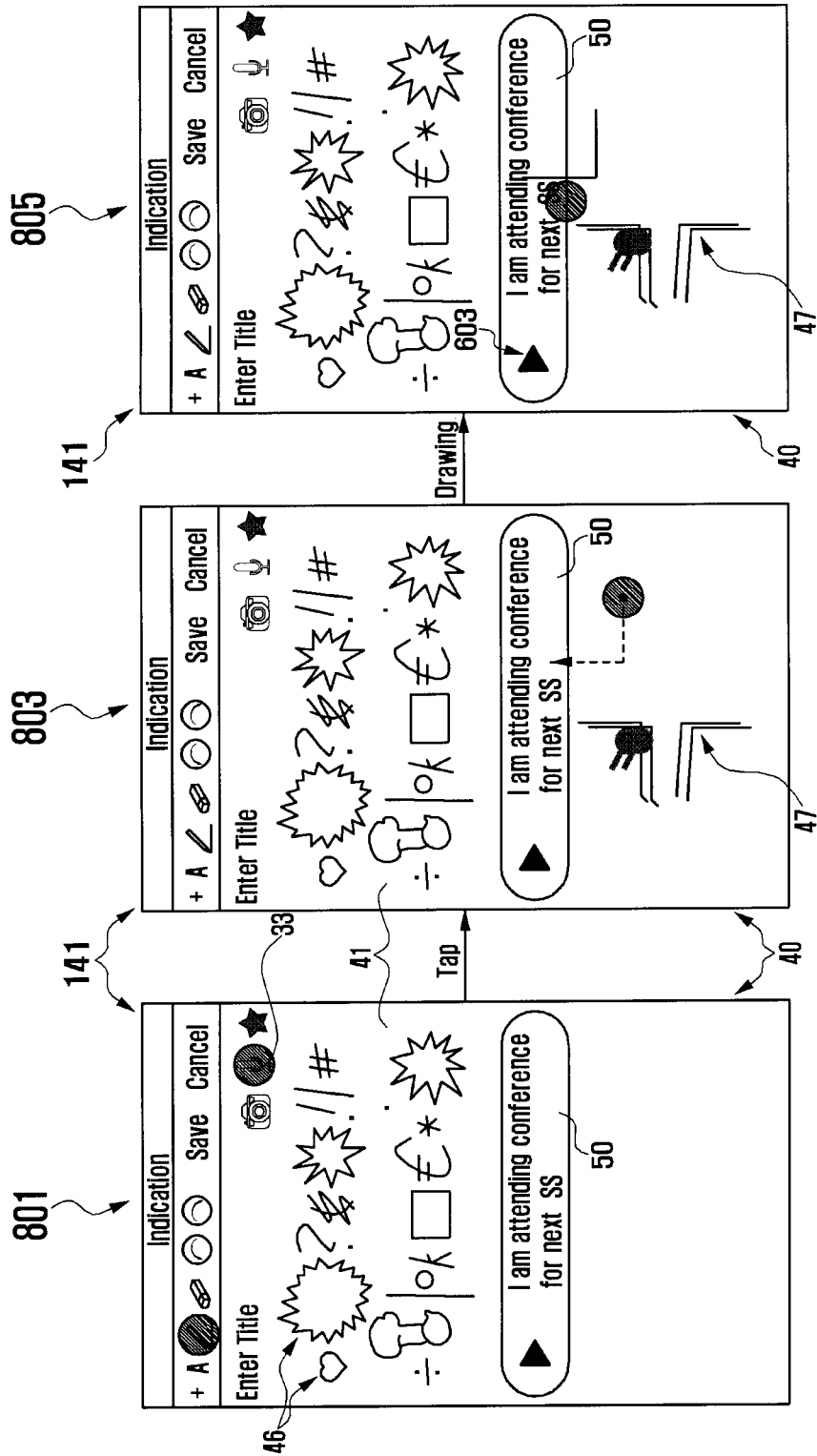
FIG. 8 is an illustration of a progression of screen interfaces for using a memo function with a multiple recording function in accordance with the exemplary embodiment of the present invention.

FIG. 8 is an illustration of a screen interface for using a memo function with a multiple recording function in accordance with the exemplary embodiment of the present invention.

Referring to FIG. 8, when the user enters an input signal for operating a multiple recording function, the device 100 may output the memo writing screen 40 on the display panel 141 in a first configuration 801. The memo writing screen 40 may contain the voice recording icon 33 for invoking a voice recording function. A voice recording process is initiated by tapping or otherwise selection of the voice recording icon 33. When the voice recording process is completed, the control unit 160 may support displaying the display zone 50 of a voice recording function on the memo writing screen 40. The display zone 50 may be positioned in relatively empty space having no memo data 46 of the memo zone 41. That is, the display zone 50 may be separated and spaced apart from the memo zone 41 having notes, scribbles, abbreviations, or other symbols as memo data.

Even after the voice recording process is completed, the user may conduct memo writing. For this, the control unit 160 may support continual displaying the memo writing screen 40 on the display panel 141 in the second configuration 803. Then the user may enter additional memo data 47 in the memo zone 41. Preferably, this additional memo data 47 may be entered in the memo zone 41 by avoiding entry in or tapping the display zone 50; for example, by drawing on the display panel 141. However, even though at least parts of the additional memo data 47 are overlapped with the display zone 50, the control unit 160 may permit such input. Namely, even though any touch event for writing the additional memo data 47 occurs and passes through the display zone 50, the control unit 160 may receive the touch event as a valid touch event and apply the generated motions of the touch event to add to the additional memo data 47.

However, as shown by the display panel 141 in the third configuration 805 in FIG. 8, although drawing occurs with the display panel 141, the control unit 160 may ignore a touch event that occurs only on the display zone 50. Namely, any touch event occurring only within the display zone 50 may be regarded as an invalid touch event and may not be applied to the additional memo data 47. In this process, the control unit 160 may output an alarm sound or vibration, or alternatively other visual messages on the display panel 141, to indicate a failure of the additional memo data 47. Meanwhile, if a touch event occurs in the control map 603 of the display zone 50, as shown in FIG. 6, the control unit 160 may play recorded voices linked to the display zone 50.

Figure 9:
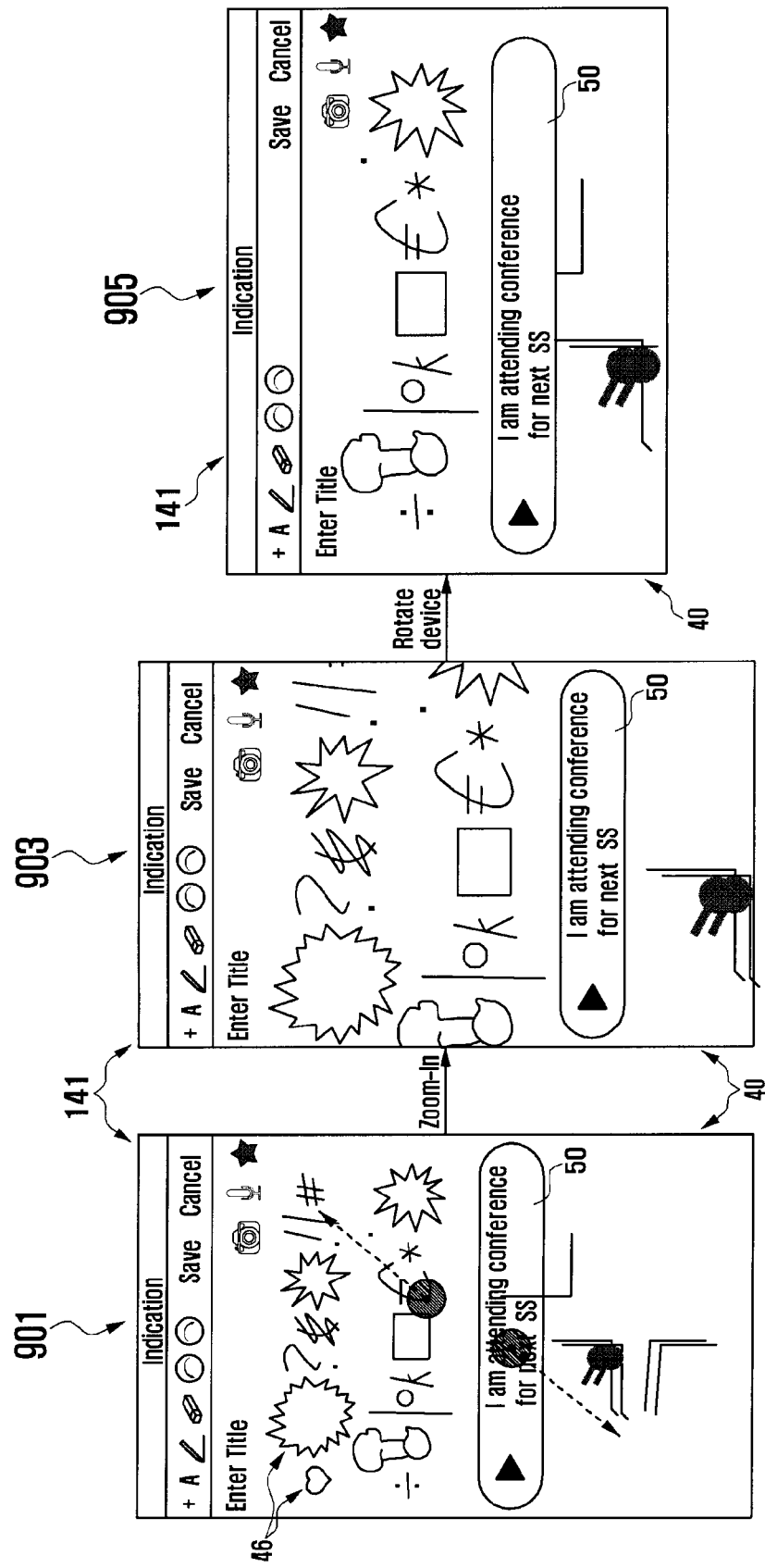
FIG. 9 is an illustration of a progression of screen interfaces for using a screen shift function with a multiple recording function in accordance with the exemplary embodiment of the present invention.

FIG. 9 is an illustration of a progression of screen interfaces for using a screen shift function with a multiple recording function in accordance with the exemplary embodiment of the present invention.

Referring to FIG. 9, the display panel 141 may display the memo writing screen 40 having the memo data 46 and the display zone 50 of a voice recording function in a first configuration 901. In this state, the user may enter an input signal for enlarging the memo writing screen For instance, the user may take a touch gesture for producing a zoom-in event on the memo writing screen 40.

Then the control unit 160 may perform screen enlargement according to the distances and speeds of touch gestures. Namely, as indicated by the display panel 141 in the second configuration 903 in FIG. 9, the control unit 160 may output an enlarged screen with a predetermined ratio around a touched point. On the other hand, if the limit of enlargement has been reached, the display zone 50 may not be enlarged and may maintain the original size. However, the control unit 160 may move the display zone 50 according to the enlargement of the memo data 46 so that the display zone 50 may not be overlapped with the memo data 46.

Meanwhile, the user may take an action for changing the mode of the device 100 from a portrait mode to a landscape mode, such as rotating the device as shown in the configurations 903, 905 of the display panel 141. The configurations 901, 903 of the display panel 141 are in a portrait mode of the device 100, while the third configuration 905 of the display panel 141 indicates a landscape mode of the device 100. In response to a change from the portrait mode to the landscape mode shown in FIG. 9, the control unit 160 may convert a lengthwise screen into a widthwise screen. Here, the control unit 160 may adjust the size of the display zone 50 to fit into the landscape mode. For instance, the control unit 160 may extend at least one direction of the display zone 50. Also, the control unit 160 may rearrange the display zone 50 on the screen to avoid an overlap with the memo data 46.

Figure 10:
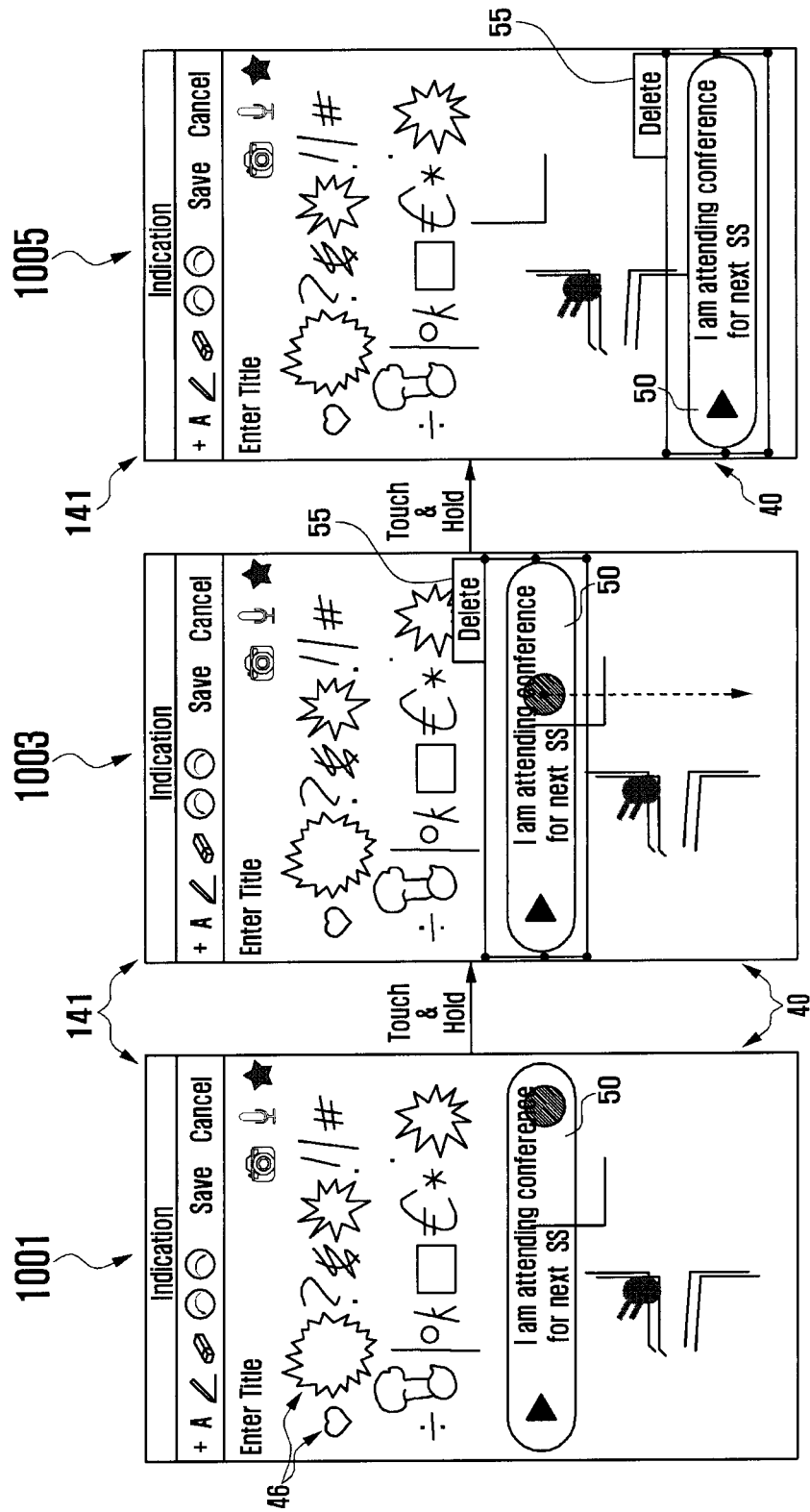
FIG. 10 is an illustration of a progression of screen interfaces for moving a display zone of a voice recording function with a multiple recording function in accordance with the exemplary embodiment of the present invention.

FIG. 10 is an illustration of a progression of screen interfaces for moving a display zone of a voice recording function with a multiple recording function in accordance with the exemplary embodiment of the present invention.

Referring to FIG. 10, the display panel 141 may display the memo writing screen 40 having the memo data 46 and the display zone 50 of a voice recording function in the first configuration 1001. In this state, the user may want to change the location of the display zone 50 and therefore the user enters an input signal for selecting the display zone 50. Namely, the user may make a specific touch gesture, e.g., a long touch, several tap touches, etc., on the display zone 50.

Then, as indicated by the display panel 141 in the second configuration 1003 in FIG. 10, the control unit 160 may offer a screen effect indicating that the display zone 50 is selected. This screen effect may be, for example, a temporary box line, a highlight, or a reverse coloring. Also, the control unit 160 may support displaying a delete button 55 used to remove the display zone 50. The user who desires to remove the display zone 50 may select the delete button 55. When an input signal for selecting the delete button 55 is received, the control unit 160 may remove voice recording data linked to the display zone 50 as well as remove the entire display zone 50.

Meanwhile, after selecting the display zone 50 of a voice recording function, the user may move the display zone 50 to any place in the memo writing screen 40. Namely, the user may conduct a touch and drag to rearrange the display zone 50. For instance, as indicated by the display panel 141 in the third configuration 1005, the user may move the display zone 50 to a lower part of the memo writing screen 40. Then, when a touch release event occurs, the control unit 160 may fix the display zone 50 to the lower part of the memo writing screen 40.

Figure 11:
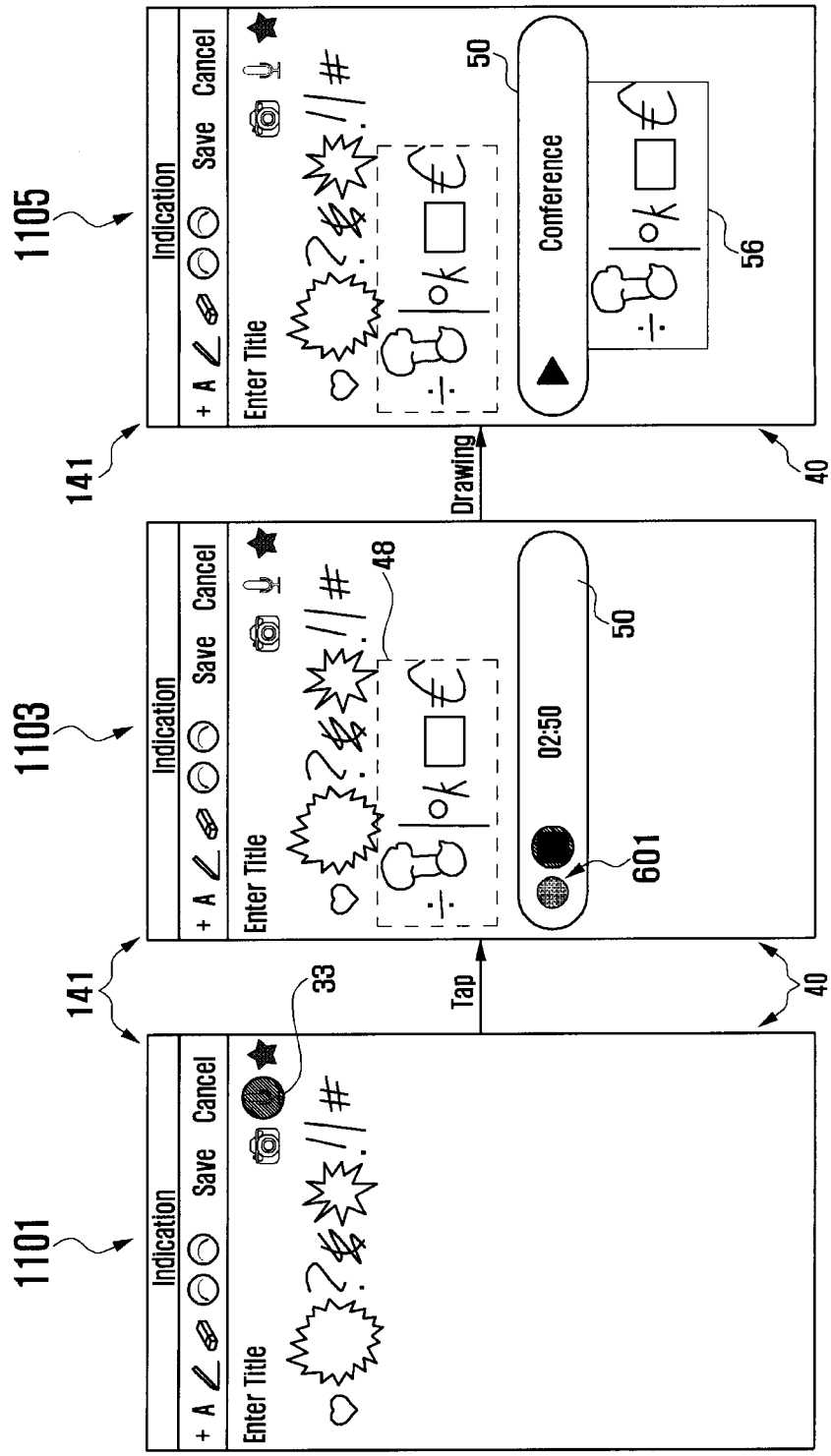
FIG. 11 is an illustration of a progression of additional display zones of a voice recording function with a multiple recording function in accordance with an alternative exemplary embodiment of the present invention.

FIG. 11 is an illustration of a progression of additional display zones of a voice recording function with a multiple recording function in accordance with an alternative exemplary embodiment of the present invention.

Referring to FIG. 11, the display panel 141 may display a progression of screen interfaces of a multiple recording function, namely the memo writing screen 40 capable of invoking a voice recording function, as shown in the first configuration 1101. Here, the control unit 160 may perform an audio-related function. The user may touch the voice recording icon 33 on the memo writing screen 40.

Then, as shown in the display panel 141 in the third configuration 1103 in FIG. 11, after receiving a tap or other user selection, the control unit 160 may activate a voice recording function and also support displaying the display zone 50 for indicating that the voice recording function is running or otherwise in use. Additionally, the control unit 160 may control a voice recording process to record audio signals received from an external device and/or collected through the microphone (MIC) in FIG. 1. Meanwhile, the user may perform memo writing during the voice recording process by drawing using touch motions on the display panel 141. The control unit 160 may then output additional memo data 48 on the memo writing screen 40 in the display panel 141 in the third configuration 1105.

In order to finish the voice recording process, the user may use the above-discussed control map 601 in the display zone 50 in FIG. 6. When the user selects the control map 601, the control unit 160 may extract the additional memo data 48 and dispose such additional memo data 48 as supplementary memo data 56 near the display zone 50.

Figure 12:
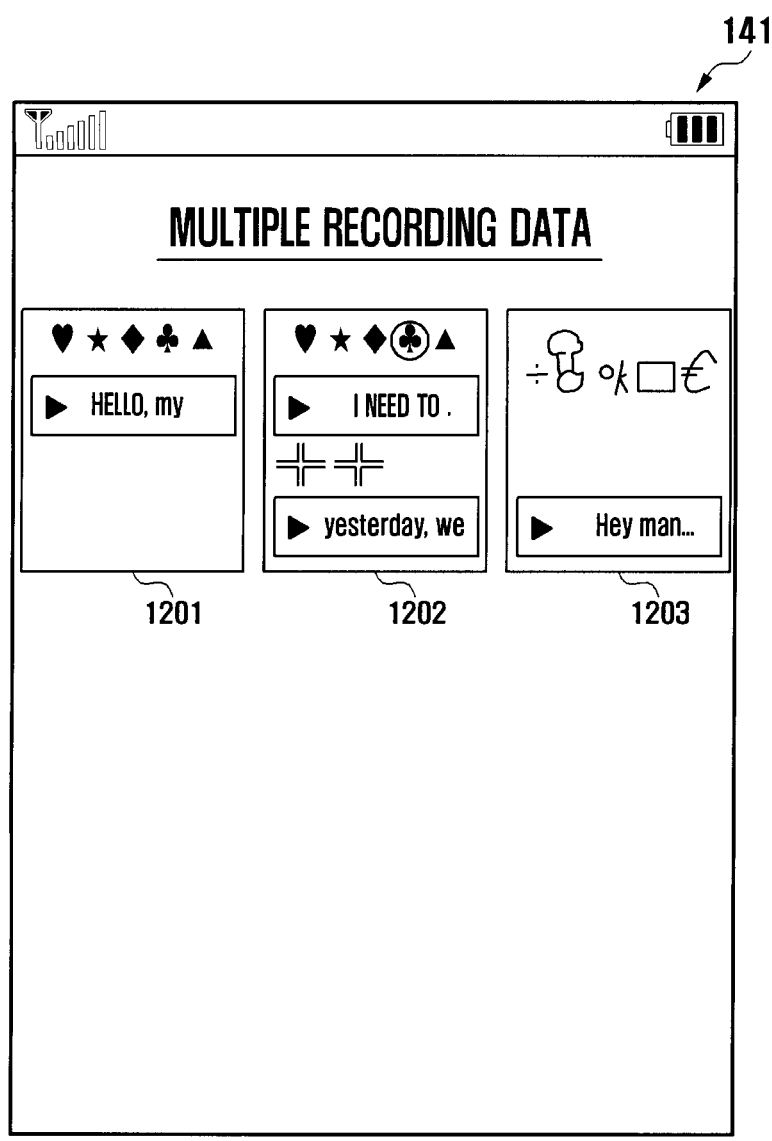
FIG. 12 is an illustration of a screen interface for retrieving data recorded using a multiple recording function in accordance with the exemplary embodiment of the present invention.

FIG. 12 is an illustration of a screen interface for retrieving data recorded using a multiple recording function in accordance with the exemplary embodiment of the present invention.

Referring to FIG. 12, the control unit 160 may convert the multiple recording data into thumbnail images and then, as shown, output the thumbnail images 1201, 1202 and 1203 on a multi-image screen of the display panel 141 showing three miniature screens, each having a respective thumbnail image 1201, 1202, 1203.

The thumbnail images 1201, 1202 and 1203 may be a combination of memo data and an image corresponding to the display zone, each of which is reduced at a predetermined ratio. For instance, the first thumbnail image 1201 may be a combination of memo data and one display zone centrally disposed on the first miniature screen. The second thumbnail image 1202 may be a combination of memo data and two display zones separately disposed on the second miniature screen. The third thumbnail image 1203 may be a combination of memo data and one display zone moved toward the lower part of the third miniature screen.

The thumbnail images 1201, 1202 and 1203 may allow the user to quickly and easily understand the contents thereof.

Figure 13:
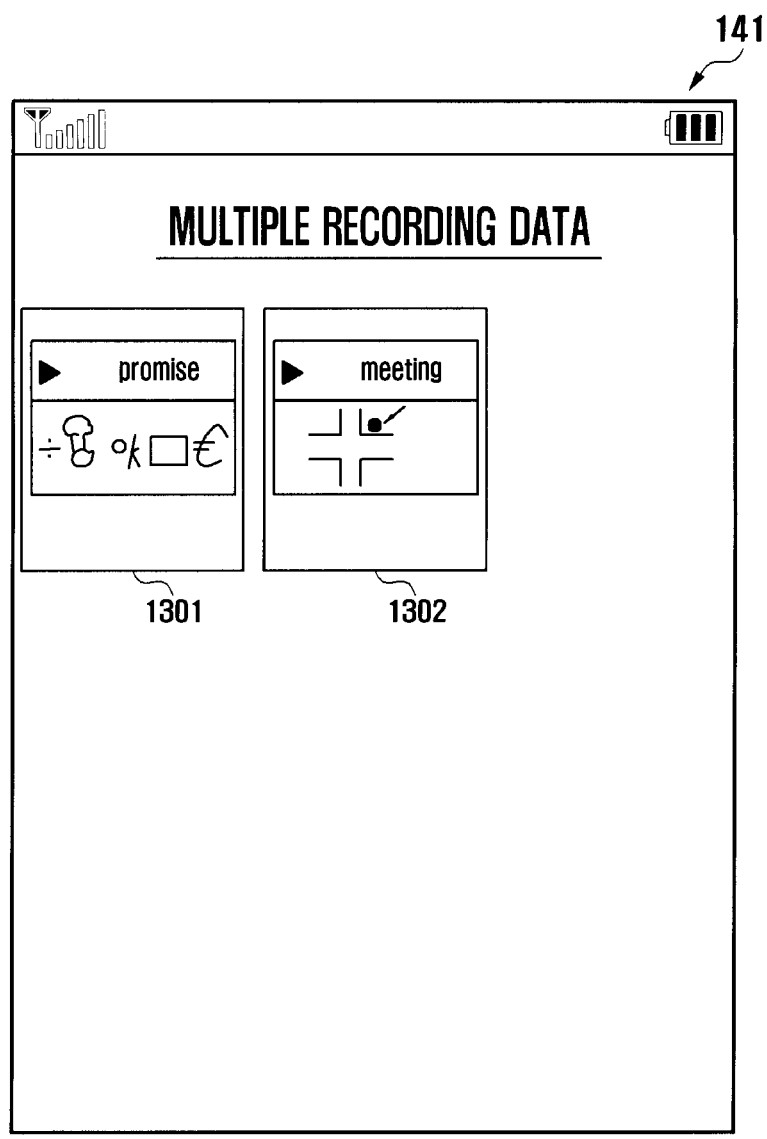
FIG. 13 is an illustration of a screen interface for retrieving data recorded on the basis of a multiple recording function in accordance with another alternative exemplary embodiment of the present invention.

FIG. 13 is an illustration of a screen interface for retrieving data recorded on the basis of a multiple recording function in accordance with another alternative exemplary embodiment of the present invention. Referring to FIG. 13, the display panel 141 may display two thumbnail images 1301 and 1302 corresponding to two sets of multiple recording data. These thumbnail images 1301 and 1302 may be multiple recording data separately created by the same or by different recording methods. Namely, the thumbnail images 1301 and 1302 shown in FIG. 13 may be created from multiple recording data in which supplementary memo data is added to a display zone of the voice recording function since memo data is additionally written during voice recording.

A title outputted in the display zone may be determined from specific words frequently used more than a predetermined number of times according to the result of voice recognition for voice recording data. For instance, the first thumbnail image 1301 may be created from multiple recording data having voice recording data in which a word "promise" is contained more than a predetermined number of times. Similarly, the second thumbnail image 1303 may be created from multiple recording data having voice recording data in which a word "meeting" is contained more than a predetermined number of times.

These thumbnail images 1301 and 1302 may allow the user to easily determine the entire contents of each set of multiple recording data, and therefore to understand their information without invoking the originals of the multiple recording data through selection of respective thumbnail images 1301, 1302.

The above-discussed portable device 100 may essentially or selectively include any other known elements, components, and functions. For instance, the portable device 100 may further include a short range communication module, a digital camera module, a wired or wireless data transmission interface, an Internet access module, a digital broadcast receiving module, and so forth. According to digital convergence tendencies with technology, such elements may be varied, modified and improved in various ways, and any other elements equivalent to the above elements may be additionally or alternatively equipped in the portable device 100. Meanwhile, as will be understood by those skilled in the art, some of the above-mentioned elements in the portable device 100 may be omitted or replaced with another.

Additionally, the portable device 100 of this invention may include any types of electronic devices that support a memo function and a voice recording function. For instance, the portable device 100 may include mobile communication devices, multimedia players and their application equipment, especially including many mobile communication terminals based on various communication protocols, a portable multimedia player (PMP), a digital broadcasting player, a personal digital assistant (PDA), a music player (e.g., an MP3 player), a portable game console, a smart phone, a notebook, a handheld personal computer, etc.

The above-described apparatus and methods according to the present invention can be implemented in hardware, firmware or as software or computer code that can be stored in a recording medium such as a CD ROM, a RAM, a ROM, a floppy disk, DVDs, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A method in an electronic device, comprising:
   in response to activation of a multiple recording function, displaying on a touchscreen of the electronic device a memo writing screen including a memo zone in which touch inputs to the touchscreen are displayed visually as memo data, a voice recording icon displayed within the memo zone with the memo data and selectable to activate voice recording functions, and a voice recording display zone representing a prerecorded audio memo;
   in response to detecting selection of the voice recording icon, activating a first voice recording function to record voice recording data through a microphone of the electronic device; and
   when a particular touch input begins in the memo zone away from the voice recording display zone and is dragged through the voice recording display zone, generating additional memo data for display corresponding to the dragged particular touch input, the additional memo data including a portion overlapping the displayed voice recording display zone.

2. The method of claim 1, further comprising:
   creating the voice recording data based on recorded sounds detected through the microphone when the first voice recording function is completed; and
   combining the memo data and the voice recording data for storage as multiple recording data,
   wherein when the particular touch input is initially detected in the voice recording display zone, the particular touch input is ignored as an invalid touch event that is not applied to the additional memo data.

3. The method of claim 2, further comprising:
   displaying a plurality of thumbnail images, each thumbnail image representing one of a plurality of multiple recording data.

4. The method of claim 2, further comprising:
   in response to activation of the first voice recording function, displaying a first voice recording display zone disposed within the memo zone and below the visually displayed memo data, the first voice recording display zone including at least one of a control map for controlling recording and a duration of recording.

5. The method of claim 4, further comprising:
   after the first voice recording function is completed, in response to receiving a second input signal selecting the voice recording icon, activating a second voice recording function; and
   displaying a second voice recording display zone on the memo writing screen, such that the second voice recording display zone is separated from the first voice recording display zone.

6. The method of claim 2, further comprising:
   converting at least a portion of the recorded sounds into a text, wherein the voice recording display zone further includes display of at least a portion of the text as a title.

7. The method of claim 6, wherein the at least a portion of the text comprises particular words in the text that are repeated throughout the text more than a predetermined number of times.

8. The method of claim 4, further comprising displaying the first voice recording display zone including the control map and a time of recording, wherein:
   when the voice recording data is being recorded, displaying the time of recording to indicate that the first voice recording function is being recorded, and displaying the control map including a stop button selectable to stop recording to indicate completion of the first voice recording function;

when playback of the voice recording data is stopped, the first voice recording display zone including a play button for activating playback of the voice recording data;

when playback of the voice recording data is active, displaying at least one of a progress bar and a playback time, the first recording display zone including a pause button to pause playback and the stop button to stop playback; and when playback of the voice recording data is paused, displaying the play button to resume playback and the stop button to stop playback.

9. The method of claim 4, further comprising:
receiving additional memo data while the voice recording data is being recorded; and
displaying the additional memo data as supplementary memo data and visually attaching the supplementary memo data to the first voice recording display zone when recording of the voice recording data is complete.

10. The method of claim 4, further comprising at least one of:
when an input signal for moving the first voice recording display zone is received, moving the first voice recording display zone on the memo writing screen according to the input signal; and
when the first voice recording display zone is selected, displaying a delete button disposed adjacently to an outline enclosing the first voice recording display zone, the delete button selectable to remove the first voice recording display zone from display.

11. An electronic device, comprising:
a touchscreen configured to receive touch inputs;
a microphone configured to record sounds; and
a control unit, configured to:
in response to activation of a multiple recording function, display on the touchscreen a memo writing screen including a memo zone in which touch inputs to the touchscreen are displayed visually as memo data, a voice recording icon displayed within the memo zone with the memo data and selectable to activate voice recording functions, and a voice recording display zone representing a prerecorded audio memo,
in response to detecting selection of the voice recording icon, activate a first voice recording function to record voice recording data through the microphone, and
when a particular touch input begins in the memo zone away from the voice recording display zone and is dragged through the voice recording display zone, generating additional memo data for display corresponding to the dragged particular touch input, the additional memo data including a portion overlapping the displayed voice recording display zone.

12. The device of claim 11, further comprising:
a memory unit configured to store data, the control unit further configured to:
create voice recording data based on recorded sounds detected through the microphone when the first voice recording function is completed, and
combine the memo data and the voice recording data for storage as multiple recording,
wherein when the particular touch input is initially detected in the voice recording display zone, the particular touch input is ignored as an invalid touch event that is not applied to the additional memo data.

13. The device of claim 12, wherein the control unit is further configured to control the touchscreen to display a plurality of thumbnail images, each thumbnail image representing one of a plurality of multiple recording.

14. The device of claim 12, wherein control unit further controls the touchscreen to display a first voice recording display zone disposed within the memo zone and below the visually displayed memo data, the first voice recording display zone including at least one of a control map for controlling recording and a duration of recording on the memo writing screen in response to activation of the first voice recording function.

15. The device of claim 14, wherein the control unit is further configured to:
after the first voice recording function is completed, in response to receiving a second input signal selecting the voice recording icon, activate a second voice recording function, and
control the touchscreen to display a second voice recording display zone on the memo writing screen, such that the second display zone is separated from the first display zone.

16. The device of claim 14, wherein the control unit is further configured to convert at least a portion of the recorded sounds into a text, wherein the first voice recording display zone further includes display of at least a portion of the text as a title.

17. The device of claim 16, wherein the at least the portion of the text comprises particular words in the text that are repeated throughout the text more than a predetermined number of times.

18. The device of claim 14, the control unit further configured to control the touchscreen to display the first voice recording display zone including the control map and a time of recording, wherein:
when the voice recording data is being recorded, the control unit controls the touchscreen to display the time of recording to indicate that the first voice recording function is being recorded, and displaying the control map including a stop button selectable to stop recording to indicate completion of the first voice recording function;
when playback of the voice recording data is stopped, the first voice recording display zone includes a play button for activating playback of the voice recording data;
when playback of the voice recording data is active, the control unit controls the touchscreen to display at least one of a progress bar and a playback time, the first recording display zone including a pause button to pause playback and the stop button to stop playback; and
when playback of the voice recording data is paused, the control unit controls the touchscreen to display the play button to resume playback and the stop button to stop playback.

19. The device of claim 14, wherein the control unit is further configured to:
receive additional memo data while the voice recording data is being recorded; and
control the touchscreen to display the additional memo data as supplementary memo data and visually attaching the supplementary memo data to the first voice recording display zone upon when recording of the voice recording data is complete.

20. The device of claim 14, wherein the control unit is further configured to execute at least one of:
   when an input signal for moving the first voice recording display zone is received, moving the first voice recording display zone on the memo writing screen according to the input signal; and
   when the first voice recording display zone is selected, controlling the touchscreen to display a delete button disposed adjacently to an outline enclosing the first voice recording display zone, the delete button selectable to remove the first voice recording display zone from display.

* * * * *